Jan. 25, 1966   P. E. GORDON ET AL   3,231,479
METHOD OF MANUFACTURING A CAPACITOR
Filed Sept. 11, 1961
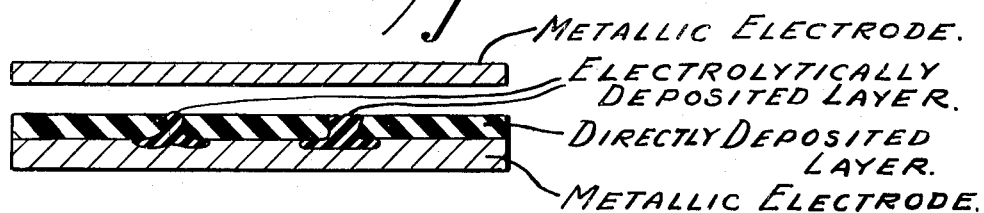
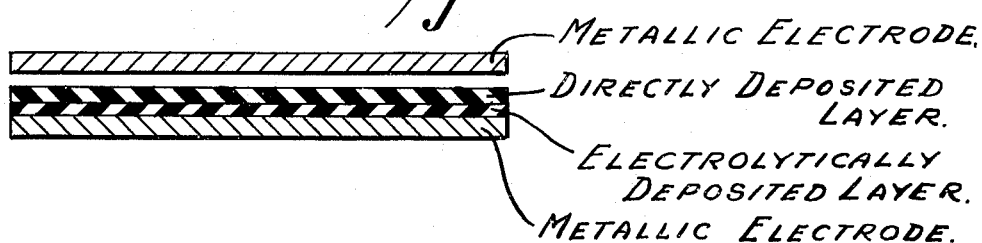
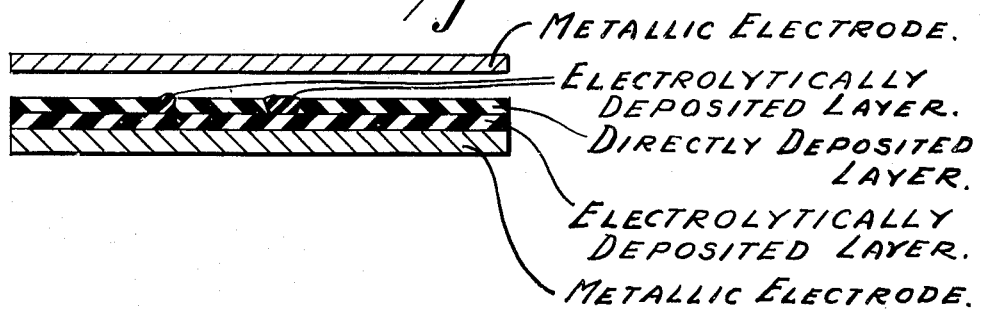
INVENTORS
PAUL E. GORDON
AND ANDREW HERCZOG
BY Clarence R. Patty, Jr.
ATTORNEY 3,231,479
METHOD OF MANUFACTURING A CAPACITOR
Paul E. Gordon, Big Flats, and Andrew Herczog, Painted Post, N.Y., assignors to Corning Glass Works, Corning, N.Y., a corporation of New York
Filed Sept. 11, 1961, Ser. No. 137,373
3 Claims. (Cl. 204—38)

This invention relates to improvements in electrical capacitors and more particularly to compositions and methods of manufacture of improved dielectrics for use therein.

The desirability of producing small capacitors combining the characteristics of high capacitance, high breakdown voltage, low leakage loss and low temperature coefficients of capacitance is well-recognized. Since capacitance is directly proportional to the dielectric constant of the medium separating the conducting plate and inversely proportional to the distance separating the plates, the desirability of producing dielectric media having high dielectric constants and at the same time having characteristics permitting their utilization in the form of thin films is apparent. However, it is well known that as the thickness of a capacitor dielectric is decreased and the capacitor plates are brought correspondingly closer together, there are concomitant increases in leakage losses and decreases in the breakdown voltage of the capacitor. These unwanted variations are aggravated by the fact that, as the dielectric becomes thinner, defects therein in the form of weak spots resulting from cracks and pinholes become of increasing significance.

Accordingly, it is an object of this invention to provide a dielectric material having the above-mentioned desirable characteristics while at the same time being relatively free from the deleterious effects of such weak spots.

The objects of this invention are accomplished in general by the formation of a dielectric comprising at least two separately formed layers, one of these layers being formed by electrolysis and the other being formed by non-electrolytic methods, as, for example, by vapor deposition or by deposition from a solution.

Electrolytically formed dielectric layers on metallic electrodes are well known. Such layers are formed in general by immersing a metallic strip in an electrolyte as an anode and applying a potential sufficient to effect oxidation in situ of the surface of the strip which serves also as the capacitor plate metal. A description of a typical process for electrolytically forming a dielectric oxide layer on aluminum may be found in U.S. Patent 2,408,910. Similarly, processes for forming dielectric films by deposition from liquids or vapors by hydrolytic or pyrolytic reactions, vacuum evaporation or other non-electrolytic methods, which processes will be referred to hereinafter as direct deposition processes, are known in the art. By way of example, reference is made to U.S. Patent 2,908,593, which discloses a method for the hydrolysis of a solution of an organotitanate to form a dielectric layer containing titanium dioxide.

The present invention utilizes the combination of at least one of each of these types of film to produce dielectrics having advantages not obtainable with either type of film used alone.

Preferred embodiments of dielectrics according to this invention are illustrated in the accompanying drawing, wherein:

FIG. 1 is a sectional view of a capacitor having a dielectric in the form of a first layer directly deposited on an electrode of an anodizable metal and an electrolytically formed layer produced thereafter in order to seal pinholes in the first layer, with the second electrode shown spaced from the dielectric layers for clarity of illustration, FIG. 2 is a view similar to FIG. 1 with a directly deposited layer on top of an electrolytically formed layer, and FIG. 3 is a view of the capacitor of FIG. 2 with the addition of the second electrolytically formed layer.

As can be seen from the drawing, when an electrode having a previously directly deposited dielectric layer is anodized, the result is not a continuous layer but rather a number of discrete anodized spots corersponding to the locations of the pinholes in the directly deposited layer. For convenience these simultaneously deposited spots will be referred to collectively as a layer.

Electrolytically deposited dielectric films are characteristically uniform in thickness and breakdown strength. This is a result of the electrolytic process and is due to the fact that whenever one spot on an electrode is covered with a thinner coating of dielectric than another spot, there results, due to the decreased resistance at that spot, a greater current flow and a consequently faster rate of electrolysis. This phenomenon, which will be referred to as a self-correcting action, is of special value when, as illustrated in FIGS. 1 and 3, a dielectric film is electrolytically formed to seal pinholes in a dielectric film that has been deposited directly. This value results from the tendency of the electrolytic action to form a film at those very points where the directly deposited dielectric film is defective.

The practical advantage resulting from this self-correcting action is found in the uniformly high breakdown voltage values found at each point of electrolytically formed films. Such films, however, are found to have disadvantages when utilized singly. Among these disadvantages are low dielectric constants especially in the case of anodized aluminum, high leakage currents and dissipation factors and asymmetrical current-voltage characteristics, which permit their use in capacitors only with a D.C. bias. However, their advantages can be utilized in combination with directly deposited dielectric films which, although subject to weak spots have higher dielectric surface, however, tend to be relatively pinhole-sipation factors and leakage currents and are capable of being formed with greater thicknesses than anodic films.

Dielectric films directly deposited on conducting substrates are subject to pinhole defects. These pinholes readily admit subsequently deposited conducting material, producing paths of high leakage current between electrodes. Dielectric films directly deposited over a dielectric surface, however, tend to be relatively pinhole-free, except that if a pinhole exists in the underlying dielectric surface through which a conductor is exposed, then a corresponding pinhole is generally reproduced in the newly deposited dielectric layer. Such pinholes may reproduce throughout several serially deposited dielectric layers, resulting in a potential shorting path whenever a conductor is finally applied. Whenever, a pinhole-free dielectric film is produced in a conducting substrate, as by anodic oxidation, then the frequency of pinholes in subsequently direct-deposited dielectric films is greatly reduced, so that larger useful capacitive areas, or better selection rates, or both may be readily obtained. The anodic oxide dielectric film may be made extremely thin, so that its effect on the system capacitance per unit area is small. Hence, the film sequence illustrated in FIG. 2, has the benefit of this advantageous combination and is superior to either type of film used individually. The combination of three films illustrated in FIG. 3 is designed to add the advantage of self-corrective action to the combination of FIG. 2.

Particularly effective capacitors have been manufactured in the form illustrated in FIG. 3. The individual layers are formed according to the well-known processes of anodization and vapor deposition. First, a piece of high purity aluminum foil is anodized, for example, in a solution of boric acid to form a thin, non-porous layer of aluminum oxide. In place of foil there may be substituted a metallic film which has been vacuum-deposited on a dielectric substrate. Next, a layer of high dielectric constant titania is deposited in a manner well known in the art by the fuming of $TiCl_4$ and its subsequent hydrolysis in contact with the heated aluminum-aluminum oxide substrate to deposit a layer of titania. Next, the titania coated substrate is once again anodized in the same electrolyte to seal any weak spots which might be present due to any defects in the first two layers. Finally, a second aluminum counterelectrode is placed on top of the layers thus formed.

Capacitors formed in this manner exhibit in combination all of the advantages previously listed, the most prominent advantage being the dielectric uniformity resulting form the minimizing of weak spots therein.

It should be understood that capacitors may be manufactured according to this invention employing electrodes of metals other than aluminum and having directly deposited films other than titania. Among such other metals are tantalum, zirconium, lanthanum and niobium. Directly deposited films may include the oxides of these or other metals in addition to certain sulphides, nitrides or fluorides known to have desirable dielectric properties, for example, the fluorides of magnesium and cerium.

What is claimed is:

1. The process of making a capacitor which comprises the steps of providing a first electrode, forming upon said first electrode a directly deposited layer of dielectric material which is subject to defects in the form of at least one opening which exposes a portion of the surface of said first electrode, anodizing said first electrode in order to deposit dielectric material in said opening in said directly deposited layer, and applying a second electrode separated from said first electrode by said dielectric materials.

2. The process of making a capacitor which comprises the steps of providing an aluminum electrode, anodizing said aluminum electrode to form thereon a layer of aluminum oxide, directly depositing on said layer of aluminum oxide a layer of titania, said layer of titania being subject to defects in the form of openings which expose portions of the surface of said aluminum oxide, subsequently anodizing said electrode a second time in order to deposit aluminum oxide in said openings in said layer of titania, and subsequently applying a second electrode separated from said aluminum electrode by said titania and said aluminum oxide.

3. The process of making a capacitor which comprises providing a first electrode, anodizing said first electrode to form an anodized dielectric layer thereon, forming on said anodized dielectric layer a directly deposited dielectric layer subject to defects in the form of openings which expose portions of the surface of said anodized dielectric layer, anodizing said first electrode a second time in order to deposit dielectric material in said openings in said directly deposited dielectric layer, and subsequently applying a second electrode separated from said first electrode by said dielectric layers.

References Cited by the Examiner

UNITED STATES PATENTS

| | | | |
|---|---|---|---|
| 2,448,513 | 9/1948 | Brennan et al. | 204—38 |
| 2,647,079 | 7/1953 | Burnham | 204—38 |
| 2,908,593 | 10/1959 | Naidus | 317—258 X |
| 3,065,393 | 11/1962 | Okamoto et al. | 317—258 |
| 3,066,247 | 11/1962 | Robinson | 317—258 X |
| 3,087,872 | 4/1963 | Bernard | 204—58 X |
| 3,093,883 | 6/1963 | Haring et al. | 29—25.42 |
| 3,113,253 | 12/1963 | Ishikawa | 317—258 |

JOHN F. BURNS, *Primary Examiner.*